US012640296B2

(12) United States Patent
Naumoski et al.

(10) Patent No.: US 12,640,296 B2
(45) Date of Patent: May 26, 2026

(54) PERMANENT MAGNET FOR AN ELECTRIC MACHINE, ELECTRIC MACHINE, AND METHOD FOR PRODUCING A PERMANENT MAGNET

(71) Applicant: Mercedes-Benz Group AG, Stuttgart (DE)

(72) Inventors: Hristian Naumoski, Altbach (DE); Daniel Keller, Esslingen (DE); Hermann Pfeifer, Langenau (DE); Matthias Gregor, Stuttgart (DE); Andreas Buenting, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 237 days.

(21) Appl. No.: 18/714,962

(22) PCT Filed: Dec. 2, 2022

(86) PCT No.: PCT/EP2022/084315
§ 371 (c)(1),
(2) Date: May 30, 2024

(87) PCT Pub. No.: WO2023/104672
PCT Pub. Date: Jun. 15, 2023

(65) Prior Publication Data
US 2025/0079057 A1 Mar. 6, 2025

(30) Foreign Application Priority Data
Dec. 6, 2021 (DE) ..................... 10 2021 006 006.7

(51) Int. Cl.
*H01F 7/02* (2006.01)
*H02K 1/02* (2006.01)

(52) U.S. Cl.
CPC ............... *H01F 7/021* (2013.01); *H02K 1/02* (2013.01)

(58) Field of Classification Search
CPC ....... H01F 7/021; H01F 41/0253; H02K 1/02; H02K 1/2793; H02K 2213/03; H02K 15/03
See application file for complete search history.

(56) References Cited

U.S. PATENT DOCUMENTS

| | | | |
|---|---|---|---|
| 11,004,586 B2 * | 5/2021 | Azar | ................... H01F 41/0253 |
| 2018/0268976 A1 | 9/2018 | Yasumura et al. | |

FOREIGN PATENT DOCUMENTS

| | | |
|---|---|---|
| CN | 109921525 A | 6/2019 |
| CN | 110890798 A | 3/2020 |

(Continued)

OTHER PUBLICATIONS

International Search Report (PCT/ISA/210) issued in PCT Application No. PCT/EP2022/084315 dated Mar. 17, 2023 (2 pages).

(Continued)

*Primary Examiner* — Mohamad A Musleh
(74) *Attorney, Agent, or Firm* — Crowell & Moring LLP

(57) ABSTRACT

A permanent magnet includes a magnetic base body that has a direction of magnetization and at least two recesses formed orthogonally to the direction of magnetization. The at least two recesses are formed as cut-outs and run substantially parallel to each another. A first cut-out is formed out of a first side of the base body such that no material bridge remains between the first cut-out and the first side and a second cut-out is formed out of a second side of the base body such that no material bridge remains between the second cut-out and the second side. The first and second cut-outs extend only partially along a width of the base body resulting in a first material bridge from the first cut-out to the second side (Continued)

and a second material bridge from the second cut-out to the first side. The first cut-out is spaced from the second cut-out.

9 Claims, 3 Drawing Sheets

(56)                    References Cited

FOREIGN PATENT DOCUMENTS

| | | | | |
|---|---|---|---|---|
| CN | 212183213 | U | 12/2020 | |
| CN | 112531940 | A | 3/2021 | |
| DE | 101 26 730 | A1 | 1/2003 | |
| EP | 2 306 619 | A2 | 4/2011 | |
| EP | 2 760 112 | A1 | 7/2014 | |
| EP | 2760112 | B1 * | 8/2015 | .............. H02K 1/27 |
| EP | 3 457 535 | A1 | 3/2019 | |
| JP | 61-208815 | A | 9/1986 | |
| JP | H07284238 | A * | 10/1995 | ............. H02K 1/274 |
| JP | 2000228838 | A * | 8/2000 | ............. H02K 1/276 |
| JP | 2006-136130 | A | 5/2006 | |
| JP | 5440079 | B2 * | 3/2014 | ......... H01F 41/0293 |
| JP | 6878064 | B2 * | 5/2021 | ........... H01F 13/003 |

OTHER PUBLICATIONS

German-language German Office Action issued in German Application No. 10 2021 006 006.7 dated Jul. 27, 2022 (5 pages).
German-language German Office Action issued in German Application No. 10 2021 006 006.7 dated Jun. 19, 2024 (4 pages).

* cited by examiner

PERMANENT MAGNET FOR AN ELECTRIC MACHINE, ELECTRIC MACHINE, AND METHOD FOR PRODUCING A PERMANENT MAGNET

BACKGROUND AND SUMMARY OF THE INVENTION

The invention relates to a permanent magnet for an electric machine. The invention further relates to an electric machine and to a method for producing a permanent magnet.

To minimize eddy current losses, and thus heat build-up in inverter-fed permanent magnet synchronous machines, the poles are usually segmented. This can be implemented, on the one hand, by axially segmenting the rotor, in particular in radial flux machines, because the rotor is usually already produced in discs for bevelling. However, effective magnet segmentation requires more steps than an effective bevelling. On the other hand, it is possible to tangentially segment the magnet or partial pole into rotor discs, in particular in axial flux machines, in order to obtain the optimum without splitting the rotor unnecessarily frequently. This segmentation is implemented directly during production by the magnet supplier. These discs are produced from several pieces and then adhered together again. The final magnet is then polished and brought to geometric tolerances, and potentially coated. The intervening steps of producing the smaller individual parts, and then adhering them together, cause a significant increase in complexity and price in comparison with producing the magnet unsegmented in the final geometry.

EP 2760 112 A1 relates to a permanent magnet for an electric machine, wherein one or more grooves are provided in the permanent magnet, wherein the one or more grooves subdivide the permanent magnet into at least two portions, which are connected to each other by one or more bridges.

The object of the present invention is to create a permanent magnet, an electric machine and a method for producing a permanent magnet, which can be produced with reduced complexity and costs.

One aspect of the invention relates to a permanent magnet for an electric machine, having a magnetic base body, wherein the base body has a direction of magnetization, and having at least two recesses, which are formed orthogonally to the direction of magnetization in the base body.

The electric machine can be designed as an axial flux machine, in which the stator and the rotor are arranged next to each other in the axial direction in relation to the axis of rotation and thus form an axial air gap through which the magnetic flux acts, or as a radial flux machine, in which the stator and the rotor are arranged coaxially with each other and with the axis of rotation and thus form a radial air gap.

It is provided that the at least two recesses are formed as cut-outs and run substantially in parallel with each other, wherein a first cut-out is formed out of a first side of the base body and the second cut-out is formed out of a second side of the base body opposite to the first side, wherein the cut-outs extend only partially along the entire width of the base body, resulting in a first material bridge from the first cut-out to the second side and in a second material bridge from the second cut-out to the first side, and wherein the first cut-out has a first spacing from the second cut-out when viewed substantially orthogonally to the direction of magnetization.

In particular, it is thus suggested to make several cuts from the side into the permanent magnet or the base body, for example by means of a suitable cutting method, without splitting the magnet or base body in the process. These cuts alternate from the respective side, so that the eddy current minimization effect is maximized and comes very close to the values of a classic segmentation.

As an alternative, less effective cutting patterns can also be used, wherein for example one cut is made from each side. The segmentation can thus be optimally implemented "in one go" by means of a fan nozzle having several outlets. This downstream process can be implemented more cost-effectively than classic segmentation.

In particular, the cut-outs are created via water jet cutting with corresponding fan nozzles.

In particular, it is thus suggested that so many cut-outs are made that these cross-sectional surfaces of the partial regions should be as close to square as possible. Here, the thickness is in the direction of the magnetization, such that the magnet always runs corresponding to the length/width or diagonally or obliquely to the magnetization, and thus the cutting direction of the straight lines runs perpendicular to the magnetization. Here it is important that the magnet is "cut through" and is thus separated at the cuts, but not completely cut via the cutting pattern; rather regions, in particular material bridges, always remain, which keep the magnet as one part and then give it the meander shape at the end. The magnet thus remains as a single part. It is here provided that the cut-outs always begin from the opposite sides and are made in parallel as straight lines/lengths that are spaced apart from one another. The direction of the straight cutting lines, for example perpendicular to the magnetization and thus to the thickness of the magnet, can be selected and can depend on the basic shape of the magnet, and the number of cuts, this number being in particular the at least two cut-outs. The number should be selected such that at least one of the resulting partial webs of the magnet, in particular in a meander arm, corresponds as closely as possible to a square shape. The spacings of the cut-outs are then advantageously equidistant, such that, in particular in the case of cuboidal magnets, all the partial regions then have the same, in particular almost square cross-sectional surface. This applies to cutting directions both in the direction of the length and in the direction of the width, and also to oblique or diagonal arrangements.

In particular, it is thus provided that a remainder is always left over in the cuts as a material bridge to leave the magnet connected and thus to continue to keep the magnet as one part.

According to an advantageous embodiment, a width of the material bridge is shorter than a width of the cut-outs. In particular, the material bridges are thus formed such that their width is shorter than the cut-outs. Eddy currents can thus be advantageously reduced.

It is further advantageous if a width of the cut-outs corresponds to at least 80 percent of the width of the base body. For example, the material bridge can then have a width of 20 percent of the total width of the base body. In particular, the width of the cut-outs can lie between 80 percent and 95 percent of the width of the base body, wherein the width of the material bridges then corresponds in turn to between 20 to 5 percent of the total width of the base body. The magnet can thus reliably be kept as one part, and the eddy currents can be reduced.

It has further proved advantageous if a first partial surface, which is delimited by a third side that is formed orthogonally to the magnetization direction, by the first side, by the second side and by the first cut-out, is substantially the same size as a second partial surface, which is delimited by the first cut-out, by the first side, by the second side and by the second cut-out, and/or if a third partial surface, which is delimited by a fourth side that is formed orthogonally to the direction of magnetization, by the first side, by the second side and by the second cut-out, is substantially the same size as the second partial surface and/or the first partial surface. In particular, partial surfaces of the same size can thus be provided. In particular, these partial surfaces are, for example, substantially square. An advantageous meander shape can result from this embodiment, such that essentially a long meander shape of the magnet results, which forms the same width everywhere and in particular also the same cross-sectional surface over the same thickness. Corresponding currents in the magnet thus always "see" the same cross-sectional surface along the meander shape, and no local maxima can form within the magnet. In this exemplary embodiment, two cut-outs are in particular provided, such that the three partial surfaces are formed. If there are more than two cut-outs, the boundaries should be adjusted accordingly so that, for example, several partial surfaces can be delimited by two cut-outs.

In a further advantageous embodiment, at least one third cut-out is provided, which is formed substantially in parallel with one of the two cut-outs, wherein the first spacing substantially corresponds to a second spacing between the second cut-out and the third cut-out. In particular, this exemplary embodiment is a rectangular or cuboidal base surface of the base body. In particular, more than three cut-outs can also be provided here, wherein the spacings between the cut-outs are then substantially the same. Eddy current losses can thus advantageously be reduced.

In a further advantageous embodiment, the base body has a substantially rectangular base surface or a trapezoidal base surface. In particular, it is thus made possible for the permanent magnets according to the invention to be designed for different electric machines, in particular for axial flux electric machines or radial flux electric machines.

Different permanent magnet shapes can thus be provided which have the cut-outs according to the invention. In particular, permanent magnets with a rectangular base surface can advantageously be used for radial flux electric machines, and permanent magnets with a trapezoidal base surface can advantageously be used for axial flux electric machines.

It is also advantageous if, in the case of the trapezoidal base surface, a spacing between the cut-outs decreases as a function of the length of the trapezium, in particular in the case of at least three cut-outs. In particular, this is the special shape of the trapezoidal magnet, wherein here the spacings can optionally increase in size in the direction of the smaller arm of the trapezium, because the "length" decreases in this case. The same "seen" cross-sectional surface can thus advantageously be provided so that no local maxima of eddy currents form within the magnet.

It is further advantageous if a width of the material bridges is substantially the same. The eddy currents can thus be reliably reduced.

A further aspect of the invention relates to an electric machine having a permanent magnet according to the preceding aspect. The electric machine is preferably used in a motor vehicle and can advantageously be designed as an axial flux machine or radial flux machine. The motor vehicle can be designed as an at least partially electric motor vehicle or as a fully electric motor vehicle.

Another further aspect of the invention relates to a method for producing a permanent magnet for an electric machine. A magnetic base body is provided. A first cut-out is created from a first side of the base body, wherein the first side is formed orthogonally to a direction of magnetization, wherein a first material bridge to a second side of the base body is created by means of a cutting technique. A second cut-out is created from the second side of the base body opposite to the first side of the base body by means of a cutting technique, with a second material bridge to the first side.

The cutting technique can preferably be water jet cutting. It should be noted here that the production method is not limited to water jet cutting, but rather further cutting techniques can also be used. For example, the cut-out or the cut-outs can also be sawn in.

Advantageous embodiments of the permanent magnet should be seen as advantageous embodiments of the electric machine and of the method. In particular, corresponding method steps for producing the permanent magnet are also disclosed according to the preceding aspects.

Further advantages, features and details of the invention result from the following description of preferred exemplary embodiments and with reference to the drawings. The features and combinations of features specified previously in the description and the features and combinations of features specified in the following description of figures and/or shown in the figures alone can be used not only in the respectively specified combinations, but also in other combinations or in isolation without leaving the scope of the invention.

DETAILED DESCRIPTION OF THE DRAWINGS

Identical or functionally identical elements are provided with the same reference signs in the figures.

Figure 1:
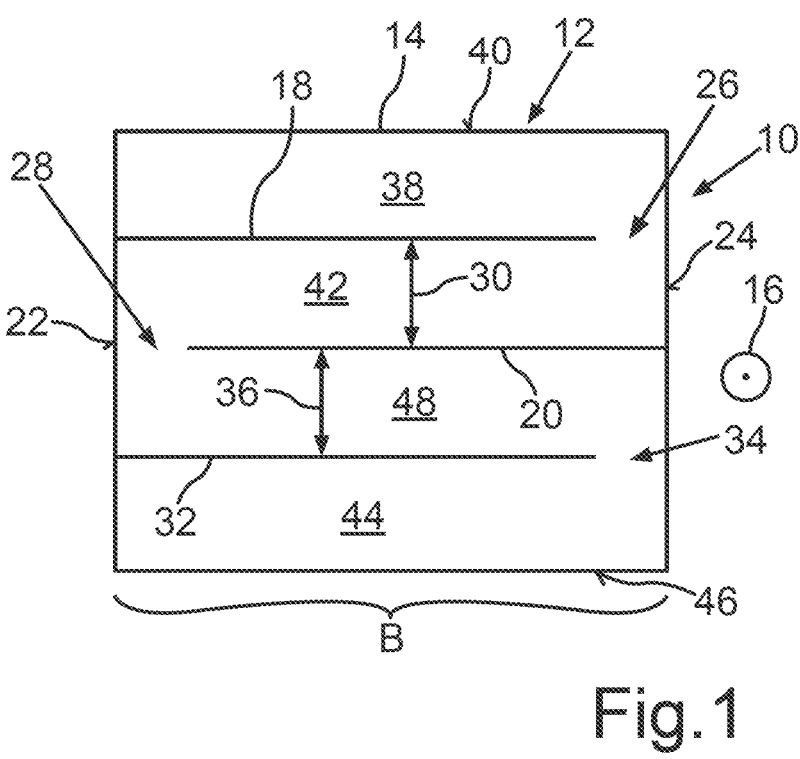
FIG. 1 shows a schematic aerial view of an embodiment of a permanent magnet.

FIG. 1 shows a schematic aerial view of an embodiment of a permanent magnet 10 for an electric machine 12 depicted purely schematically. The electric machine 12 can, for example, be designed as an axial flux machine or as a radial flux machine. The permanent magnet 10 has a magnetic base body 14, wherein the magnetic base body 14 has a direction of magnetization 16. In particular, two recesses are provided, which run orthogonally to the direction of magnetization 16. The two recesses are in particular formed as cut-outs 18, 20 and are substantially in parallel with each other, wherein a first cut-out 18 is formed out of a first side 22 of the base body 14 and the second cut-out 20 is formed out of a second side 24 of the base body 14 opposite to the first side 22, wherein the cut-outs 18, 20 extend only partially along an entire width B of the base body 14, resulting in a first material bridge 26 from the first cut-out 18 to the second side 24 and in a second material bridge 28 from the second cut-out 20 to the first side 22, and wherein the first cut-out 18 has a first spacing 30 from the second cut-out 20 when viewed substantially orthogonally to the direction of magnetization 16.

In the following exemplary embodiment, a third cut-out 32 is provided, which also extends from the first side 22 to the second side 24, wherein a third material bridge 34 is provided between the third cut-out 32 and the second side 24. It is further in particular shown that a second spacing 36 is formed between the second cut-out 20 and the third cut-out 32, wherein the first spacing 30 and the second spacing 36 are substantially the same in the present exemplary embodiment.

FIG. 1 further shows that the base body substantially has a rectangular base surface. It can further in particular be provided that a width of the material bridges 26, 28, 34 is substantially the same.

A width of the material bridges 26, 28, 34 is further in particular shorter than a width of the cut-outs 18, 20, 32. In particular, a width of the cut-outs 18, 20, 32 can correspond to at least 80 percent of the width B of the base body 14.

It is furthermore shown that a first partial surface 38, which is delimited by a third side 40 that is formed orthogonally to the direction of magnetization 16, by the first side 22, by the second side 24 and by the first cut-out 18, is substantially the same size as a second partial surface 42, which is delimited by the first cut-out 18, by the first side 22, by the second side 24 and by the second cut-out 20. A third partial surface 44 can further be provided which is delimited by a fourth side 46. In the following exemplary embodiment, the third partial surface 44 is further delimited by the third cut-out 32, by the first side 22 and by the second side 24. In the following exemplary embodiment, a fourth partial surface 48 is further shown, which is delimited by the first side 22, by the second side 24, by the second cut-out 20 and by the third cut-out 32. The partial surfaces 38, 42, 44, 48 are in particular substantially cuboidal and the same size.

In particular, a meander shape in the base body 14 is thus suggested, wherein the cut-outs 18, 20, 32 are only straight lines that alternately cut into the base body 14 from opposite sides 22, 24, but do not completely cut through the length, or presently the width B. Advantageously, the number of cuts made is such that the cross-sectional surfaces of the partial regions 38, 42, 44, 48 should be as close to square as possible. In this case, the thickness is in the direction of the direction of magnetization 16 so that the base body 14 always runs corresponding to the length or width B or diagonally or obliquely to the magnetization, and thus the cutting direction of the straight lines runs perpendicular to the magnetization.

Here it is important that the base body 14 is "cut through" and is thus separated at the cuts, but not completely cut via the cutting pattern; rather regions, in particular the material bridges 26, 28, 34, always remain, which keep the base body 14 as one part, in particular as a single part, and then give it the meander shape at the end.

It is provided here that the cuts always begin from opposite sides 22, 24 and are made substantially in parallel as straight lines or lengths that spaced apart from one another. The direction of the straight cutting lines, in particular perpendicular to the direction of magnetization 16 and thus to the thickness of the base body 14, can be selected and can depend on the basic shape of the base body 14, and the number of cuts, wherein the number should be at least two cut-outs 18, 20, 32. The number should be selected such that at least one of the resulting partial webs of the magnet, in particular in a meander arm, corresponds as closely as possible to a cuboid shape. The spacings of the cut-outs 18,

20, 32 are then advantageously equidistant, such that, in particular in the case of cuboidal magnets, all the partial regions 38, 42, 44, 48 then have the same, in particular almost square cross-sectional surface. This applies to cutting directions both in the direction of the length and in the direction of the width B, and also to an oblique or diagonal arrangement.

In particular, it is very important here that the cut-outs 18, 20, 32 always leave a remainder, in particular the material bridges 26, 28, 34 behind, such that the base body 14 is kept as one part. This uncut remainder should in particular be between 5 to 20 percent of the total width, and thus the width B, such that only 80 to 95 percent of the cut-outs 18, 20, 32 are cut.

It has proved particularly advantageous if the remaining remainder, and thus the material bridges 26, 28, 34, have the same length as the width of the cut webs, such that a long meander shape of the base body 14 substantially results, which forms the same width everywhere and also the same cross-sectional surface over the same thickness. Corresponding eddy currents in the base body 14 thus always "see" the same cross-sectional surface along the meander shape, and no local maxima can form.

Water jet cutting should in particular be seen as a preferred production method for the cut-outs 18, 20, 32. The cut-outs 18, 20, 32 can also be produced with other cutting methods or sawing methods, however.

Figure 3:
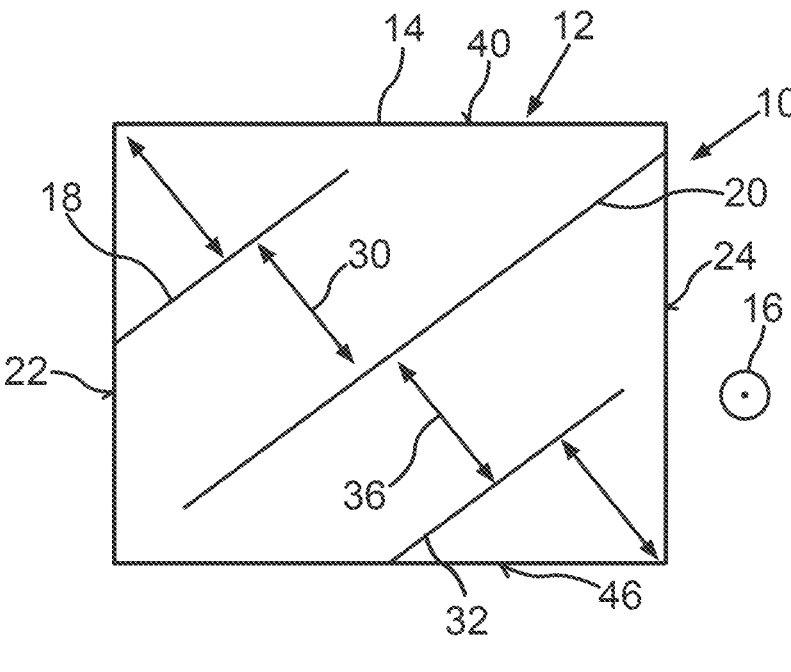
FIG. 3 shows a further schematic aerial view of an embodiment of a permanent magnet.
Figure 4:
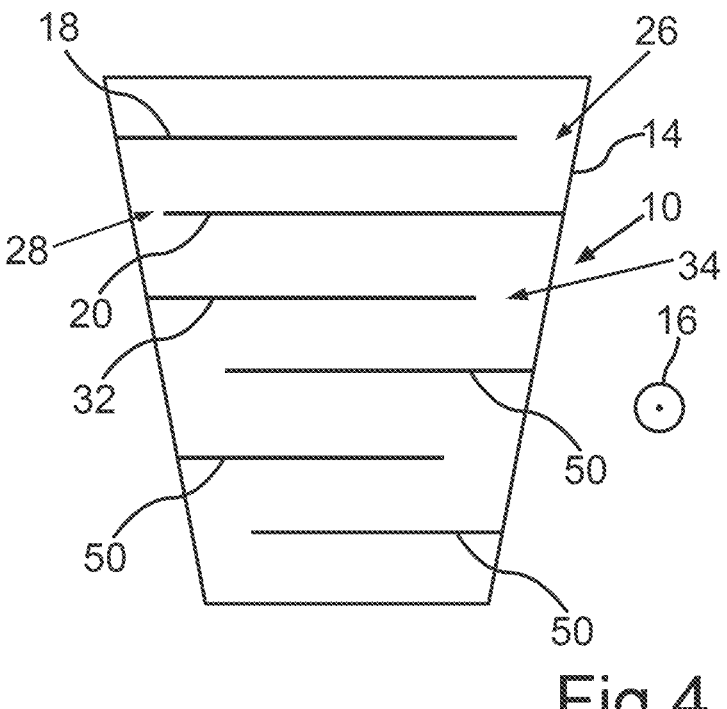
FIG. 4 shows a further schematic aerial view of an embodiment of a permanent magnet.
Figure 5:
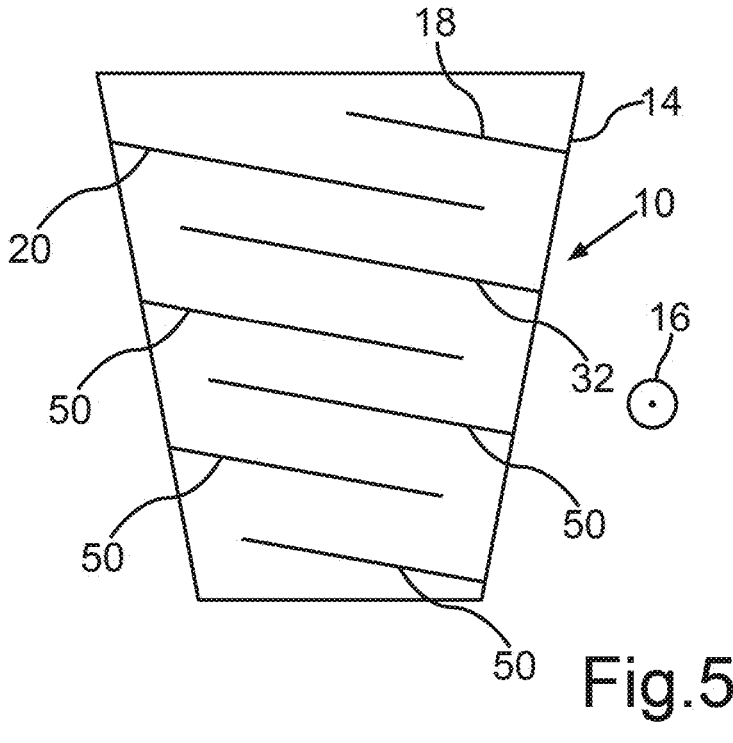
FIG. 5 shows a further schematic aerial view of an embodiment of a permanent magnet.
Figure 6:
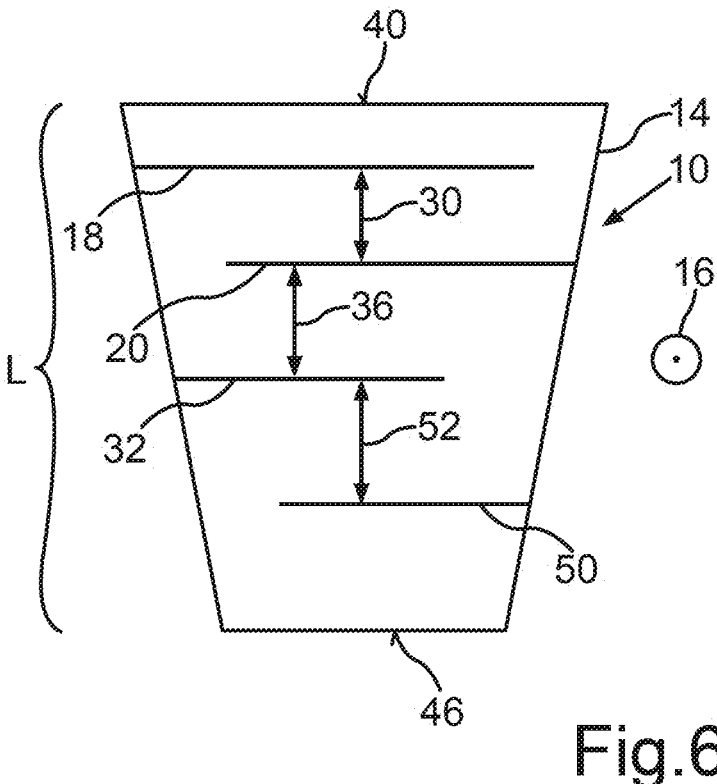
FIG. 6 shows another further schematic aerial view of an embodiment of a permanent magnet.

In particular, it can be provided that the cut-outs 18, 20, 32 are implemented axially or tangentially to the axis of the rotor of the electric machine 12. The spacings between the cut-outs 18, 20, 32 lie in the range of the magnet thickness and are ideally smaller than the magnet thickness. An even or odd number of cuts can be made. The cuts can also be made at any angle to the rotor axis. This is for example shown in FIG. 3. The cuts can also advantageously be made at an in particular diagonal angle, which results from the magnet geometry, and is depicted in FIG. 3. Other magnet geometries, for example trapezoidal geometries, as depicted in FIGS. 4, 5 and 6, can be segmented in this variant. Any angles can also be selected. The spacings between the cuts can also increase in size towards the side of the magnet that becomes thinner, in particular in the trapezoidal variant as shown in FIG. 6.

Figure 2:
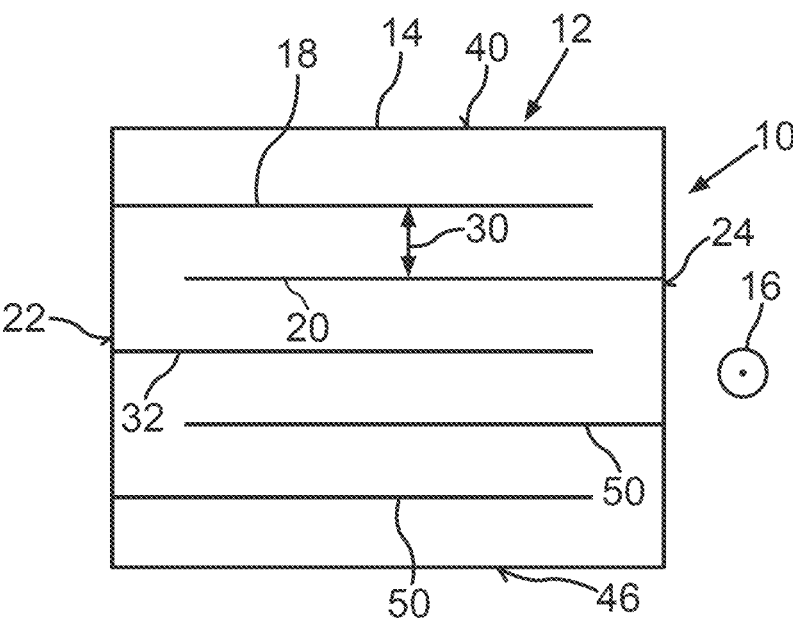
FIG. 2 shows a further schematic aerial view of a further embodiment of a permanent magnet.

FIG. 2 shows a further schematic embodiment of the permanent magnet 10. Five cut-outs 18, 20, 32 are in particular presently provided, wherein further cut-outs 50 are provided here. It is important that the cut-outs extend from the alternating sides 22 and 24.

It can further be seen that the spacings between the cut-outs 18, 20, 32, 50 are also the same. The spacing from the first cut-out 18 to the third side 40 is further for example also the same as the first spacing 30 between the first cut-out 18 and the second cut-out 20, and thus also the same as the other spacings.

FIG. 3 shows a further schematic embodiment of the permanent magnet 10, wherein in the present exemplary embodiment, the cut-outs 18, 20, 32 are in particular formed diagonally.

FIG. 4 shows a further schematic embodiment of the permanent magnet 10. In the following exemplary embodiment, the base body 14 is substantially trapezoidal. In the following exemplary embodiment, six cut-outs 18, 20, 32 are in particular provided. In this exemplary embodiment, the spacings between the cut-outs 18, 20, 32, 50 are the same.

FIG. 5 shows a further schematic aerial view of a further exemplary embodiment of a permanent magnet 10, wherein the base body 14 is still trapezoidal. In the following exemplary embodiment, it can in particular be seen that the cut-outs 18, 20, 32, 50 can also have a diagonal angle in this exemplary embodiment.

FIG. 6 shows another further schematic exemplary embodiment of a permanent magnet 10, wherein the base body 14 has a trapezoidal structure in the present exemplary embodiment. In the following exemplary embodiment, it can in particular be seen that the spacings 30, 36, 52 decrease in size as a function of a length L when viewed over the length L. In particular, the spacings presently decrease in size from the fourth side 46 to the third side 40. In particular, it is thus shown that the spacings 30, 36, 52 increase in size in the direction of the smaller arm of the trapezium, and thus presently of the fourth side 46, because the length L decreases in size.

LIST OF REFERENCE CHARACTERS

10 permanent magnet
12 electric machine
14 base body
16 direction of magnetization
18 first cut-out
20 second cut-out
22 first side
24 second side
26 first material bridge
28 second material bridge
30 first spacing
32 third cut-out
34 third material bridge
36 second spacing
38 first partial surface
40 third side
42 second partial surface
44 third partial surface
46 fourth side
48 fourth partial surface
50 further cut-out
52 further spacing
B width
L length

The invention claimed is:

1. A permanent magnet (10) for an electric machine (12), comprising:
a base body (14), wherein the base body (14) is magnetic and has a direction of magnetization (16);
wherein at least two recesses are formed orthogonally to the direction of magnetization (16) in the base body (14);
wherein the at least two recesses are formed as cut-outs (18, 20, 32, 50) and run substantially in parallel with one another, wherein the at least two recesses comprise a first cut-out (18) formed out of a first side (22) of the base body (14) such that no material bridge remains between the first cut-out (18) and the first side (22) of the base body (14), and wherein the at least two recesses comprise a second cut-out (20) formed out of a second side (24) of the base body (14) opposite to the first side (22) such that no material bridge remains between the second cut-out (20) and the second side (24) of the base body (14);
wherein the first and the second cut-outs (18, 20, 32, 50) extend only partially along an entire width (B) of the base body (14) resulting in a first material bridge (26) from the first cut-out (18) to the second side (24) and in a second material bridge (28) from the second cut-out (20) to the first side (22) and wherein the first cut-out (18) has a first spacing (30) from the second cut-out (20) when viewed substantially orthogonally to the magnetization direction (16);
wherein the base body (14) has a trapezoidal structure and wherein respective spacings (30, 36, 52) between the at least two recesses formed as cut-outs (18, 20, 32, 50) decrease in size as a function of a length (L) of the base body (14).

2. The permanent magnet (10) according to claim 1, wherein a respective width of the first and the second material bridges (26, 28, 34) is shorter than a respective width of the first and the second cut-outs (18, 20, 32, 50).

3. The permanent magnet (10) according to claim 1, wherein a respective width of the first and the second cut-outs (18, 20, 32, 50) corresponds to at least 80% of the entire width (B) of the base body (14).

4. The permanent magnet (10) according to claim 1, wherein a first partial surface (38) which is delimited by a third side (40) that is formed orthogonally to the magnetization direction (16), by the first side (22), by the second side (24), and by the first cut-out (18) is substantially a same size as a second partial surface (42) which is delimited by the first cut-out (18), by the first side (22), by the second side (24), and by the second cut-out (20).

5. The permanent magnet (10) according to claim 1, wherein the at least two recesses comprise a third cut-out (32) formed substantially in parallel with the first and the second cut-outs (18, 20, 32, 50) and wherein the first spacing (30) substantially corresponds to a second spacing (36) between the second cut-out (20) and the third cut-out (32).

6. The permanent magnet (10) according to claim 5, wherein a third partial surface (44) which is delimited by a fourth side (46) that is formed orthogonally to the direction of magnetization (16), by the first side (22), by the second side (24), and by the third cut-out (32) is substantially a same size as the second partial surface (42) and the first partial surface (38).

7. The permanent magnet (10) according to claim 1, wherein respective widths of the first and the second material bridges (26, 28, 34) are substantially a same length.

8. An electric machine (12), comprising:
the permanent magnet (10) according to claim 1.

9. The electric machine (12) according to claim 8, wherein the electric machine is an axial flux electric machine.

\* \* \* \* \*